July 24, 1962   J. E. WOODS   3,045,918
ACTUATOR
Filed Nov. 6, 1958
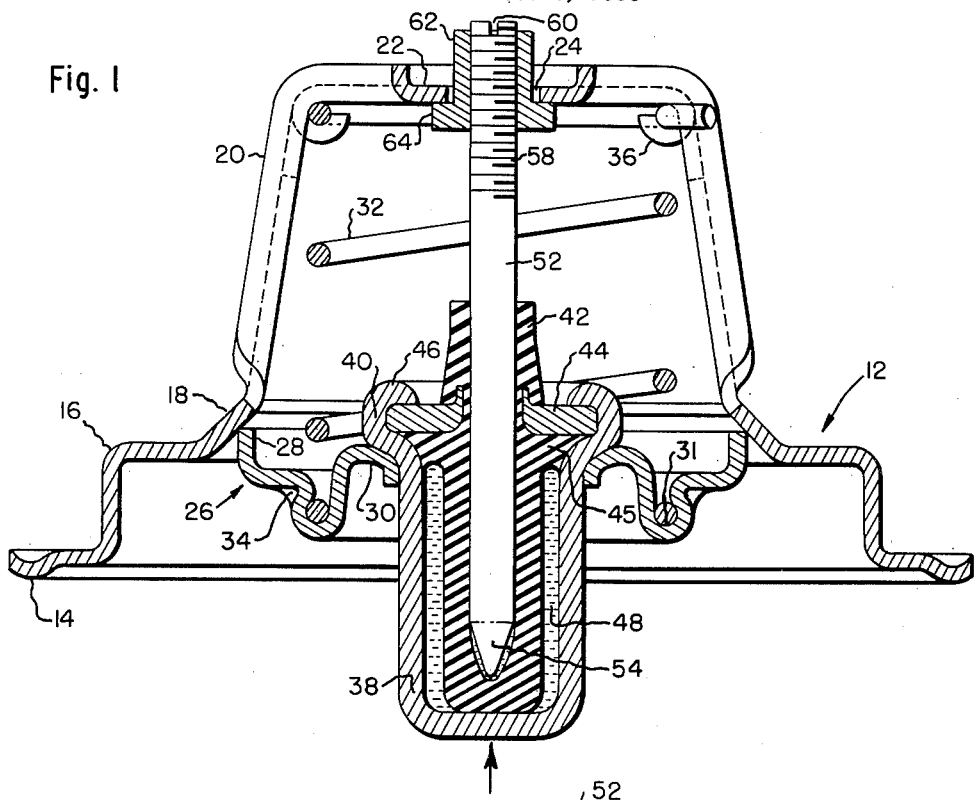
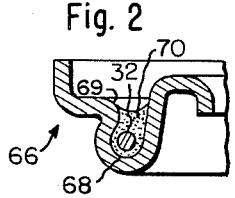
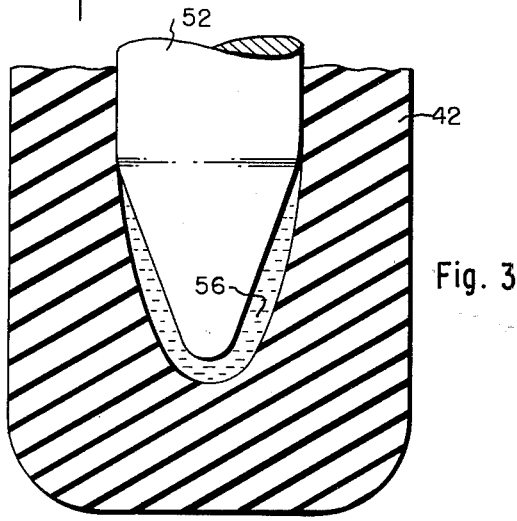
INVENTOR.
JOHN E. WOODS
BY KENWAY, JENNEY, WITTER & HILDRETH
ATTORNEYS

United States Patent Office 3,045,918
Patented July 24, 1962

---

3,045,918
ACTUATOR
John E. Woods, Cohasset, Mass., assignor to Standard-Thomson Corporation, Waltham, Mass., a corporation of Delaware
Filed Nov. 6, 1958, Ser. No. 772,235
7 Claims. (Cl. 236—34)

The present invention relates generally to thermostatically-controlled fluid valves, and more particularly to valves adapted to respond directly to the temperature of the fluid controlled thereby.

This invention relates to improvements in the thermostatic valve described in my copending application Serial No. 694,832, filed November 6, 1957. Said application describes a valve having a flanged valve seat member to be received in a fluid channel and an actuator having a housing upon which the valve member is secured. A pin is slidably received in the housing and the housing has a fill consisting of a sensitive expansible-contractible material to propel the pin from the housing by a force which is a function of the temperature of the fluid to be controlled. The pressure force is applied through a deformable body, preferably rubber or a rubber substitute, which acts as a seal for the thermal material. A tension spring tends to draw the valve against the seat member and to force the pin into the housing.

A principal object of this invention is to provide improvements in the above structure, whereby the valve member is self-aligning in relation to the seat member.

A second object is to provide means for adjusting the "starting temperature" of the valve, that is, the temperature of the controlled fluid at which the valve begins to open.

A third object is to provide a fail-safe feature, whereby the valve will open at a predetermined maximum temperature if, for any reason, the actuator should fail to open it.

A still further object resides in providing means to minimize the frictional resistance to axial movement of the actuator pin in response to temperature changes. This resistance is created by the deformable body which surrounds the pin within the housing and isolates it from the thermal fill.

With the foregoing and other objects in view, a feature of the invention resides in the provision of an adjusting nut threaded on the actuator pin and received within an opening in a portion of the flanged seat member. The last mentioned opening is sufficiently large to permit lateral self-aligning movement of the valve member.

A second feature resides in the provision of overtemperature protection by a fail-safe feature involving release of the tension spring, thereby permitting the valve to fall open.

Another feature resides in the provision of a flexible lubricant for the actuator pin, this lubricant being relatively viscous or solid below the temperature at which the valve starts to open, but relatively soft and fluid at temperatures at or above the starting temperature.

Other features of the invention reside in certain details of construction, modes of operation and arrangements of the parts which will become clear from the following description of a preferred embodiment thereof, having reference to the drawings in which FIG. 1 is a longitudinal elevation in section of the preferred form of thermostatic valve;

FIG. 2 is a detail elevation in section of an alternative form of valve member incorporating a fail-safe feature; and FIG. 3 is a detail elevation of a portion of FIG. 1 further illustrating the relation of the pin lubricant to the pin and to the surrounding deformable body.

Referring to the drawings, there is provided a metallic seat member 12, which is preferably drawn out of sheet bronze or like metal in a single piece by a series of dies. These dies form a mounting flange 14 to be fitted with gaskets to provide a fluid tight seal continuously about the wall of a fluid channel, an annular shoulder 16, a conical seat portion 18, an axially-extending spider comprising a plurality of integral legs 200, and an end portion 22 having a circular axial opening 24 therein. The fluid flows through the valve in the direction indicated by the arrow.

A drawn sheet metal valve member 26 of bronze or other suitable metal is formed with a flange 28 to close against the seat portion 18 of the member 12, and with an inner portion 30 of annular shape defining an axial opening therethrough. An annular channel 31 between the flange 28 and the innerportion 30 is also formed.

A tension spring 32 of helical shape is staked at its lower end in the channel 31 at a number of spaced locations 34. At its upper end the spring is secured to the legs 20 by inwardly-bent ears 36. Thus the spring tends to close the valve.

An actuator housing 38, preferably of the same metal as the valve and seat members, is force-fitted into the central opening in the valve member 26. At one end the housing has a shoulder portion 40 which accurately defines the position of the housing in relation to the valve member.

The actuator is constructed in conformity with the teachings in the patents to C. W. Wood Nos. 2,777,638, 2,806,375 and 2,806,376. A body 42 of deformable material having limited compressibility, preferably rubber or a rubber-substitute, is molded about a closure disk 44 having a central opening therethrough and has a flange portion 45. In fabrication, this disk with the attached body 42 is snugly fitted within the annular shoulder 40 of the housing 38, after which the housing is crimped over the disk as indicated at 46. The crimping step causes compression of the flange portion 45 of the deformable body, thus creating a pressure seal. Prior to this assembly of the disk 44 and the deformable body 42 into the housing, a sufficient quantity of temperature sensitive expansible-contractible material 48 has been placed in the housing to fill all the available space in the housing. This material is a substance that does not attack the deformable body 42, and it is preferably of high molecular size which will be effectively sealed by the above-described compression of the flange portion 45 of the body 42. Preferably, I employ a wax formulation which has a transition range of temperatures through which it passes while fusing from a solid to a liquid, one end of this range being at or near the temperature at which the valve is designed to start opening. Within this range the wax has a substantially greater expansion coefficient than at temperatures above or below the range.

A rigid, polished round metal pin 52 with a conical end portion 54 is slidably received through the disk 44 into the body 42. The body 42 is molded over a mold pin which forms a recess for the pin 52. Prior to placing the pin 52 within the deformable body, a quantity of lubricant 56 (FIG. 3), preferably of the same formulation as the material 48, is placed in the recess. These operations preferably take place at room temperature, whereat the material 56 is relatively solid and may be conveniently dispensed in the form of small pellets of measured size.

At its outer end the pin 52 is formed with threads 58 and an adjustment slot 60. A flanged adjusting nut 62 is threaded onto the pin 52. The nut 62 has a cylindrical portion of substantially smaller outer diameter than the opening 24 through which it passes, with a flange 64 of substantially larger outer diameter than the opening 24 to permit the nut to move laterally in relation to the opening without passing therethrough.

From the foregoing description it will be apparent that the clearance between the nut 62 and the opening 24 in the seat member 12 provides lateral freedom for the pin 52 permitting the spring 32 to draw the valve member 26 firmly against the seat portion 18 without obstruction by the pin. Thus the valve and seat are self-aligning.

A further feature of the nut 62 is that it provides means for initial adjustment of the valve. This is accomplished simply by turning the shaft 52 by means of a screwdriver inserted and turned in the slot 60 while holding the nut 62 fixed. The adjustment is made so that the valve will start to open at a selected temperature under the force exerted by the pin 52. At temperatures below this value the thermal fill 48 within the housing 38 does not apply sufficient longitudinal thrust to the pin 52 to push the valve from its seat, and at temperatures above this value the valve is opened by corresponding amounts.

This construction of the valve has a further advantage, in that the actuator unit comprising the housing 38, the pin 52 and the nut 62 may be assembled and adjusted to a required starting temperature independently of the other parts of the assembly. To make the initial adjustment it is only necessary to immerse the housing 38 in a suitable container maintained at the desired starting temperature, and then to adjust the nut 62 so that the face of the flange 64 which abuts the end portion 22 of the seat member 12 is at a predetermined distance from the housing 38 equal to the distance between these points in the assembled valve at the starting temperature. In calibration, sufficient longitudinal pressure is applied to the pin 52 to force it firmly into the housing 38 as far as it will go without substantial compression of the body 42 or the material 48. After calibration the assembly of the valve may then be completed. This involves assembling the valve member 26 with the spring 32 staked thereon over the housing 38, placing the assembly into the seat member 12 so that the nut 62 extends into the opening 24, stretching the spring 32, and turning the ears 36 inwardly to hold the spring under tension.

It will be understood that in place of providing a flanged seat member 12, it is possible to provide a modified form of thermostat housing in cast form. This casting may form part of the fluid channel, and may be provided with a ground seat portion corresponding to the portion 18. Within the casting an inwardly-projecting portion may be cast or fitted to form an abutment corresponding to the end portion 22 for the nut 62. Suitable provision may also be made to secure the spring 32 to the housing.

A fail-safe feature may be provided according to the variant illustrated in FIG. 2. A valve member 66 is constructed similarly to the member 26 of FIG. 1, except that the member 66 is provided with an annular channel 68 of modified shape. This recess is of larger diameter than the wire of the spring 32 and has an inwardly-projecting edge 69 having a diameter slightly larger than the outside diameter of the spring coil. The spring 32 is held in place within the recess 68 by a fusible metal alloy or a plastic 70 which prevents the spring from leaving the recess when hard but softens sufficiently to release the spring at a predetermined temperature above the range of normal operation of the valve. At this predetermined temperature the spring 32 is released and the valve with the attached actuator is free to fall from the seat 18, thereby permitting maximum fluid circulation and cooling.

The above-described actuator may be constructed of small size and still provide the necessary thrust to overcome the spring 32 and the fluid pressure. This feature results in large measure from the reduction in friction between the pin 52 and the body 42 afforded by the lubricant 56. This lubricant begins to fuse at the starting temperature of the valve and has good mobility above that temperature. The action of the deformable body also automatically redistributes the lubricant on each cycle of the pin. Each time the pin moves out of the housing the body 42 flattens behind the conical end 54 and the pressure on the flattened portion spreads the lubricant therein.

It will be understood that while the invention has been described with reference to a specific preferred embodiment thereof, various modifications therein may be accomplished by one skilled in this art without departing from the spirit or scope thereof.

Having thus described the invention, I claim:

1. A temperature-controlled valve having, in combination, a seat member having a seat portion and a second portion longitudinally displaced from the seat portion, said second portion having an opening coaxial with the seat portion, a valve member to cooperate with the seat, a tension spring secured to said second portion and valve member and tending to close the valve, and an actuator, the actuator having a housing secured to the valve member, a pin extending from the housing and having a threaded portion and an adjusting nut threaded on the pin, the nut having a portion of reduced outside diameter loosely received in said opening and a flange of larger outer diameter than said opening and situated between the housing and said opening, said seat member laterally restraining said actuator only by means of said nut and spring, the actuator further having means responsive to the temperature of a fluid circulated through the valve to tend to open the valve by extending the pin from the housing upon an increase in said temperature to cause said flange to bear against said second portion of the seat member about said opening.

2. A self-aligning valve having a seat portion, an abutment longitudinally displaced from the seat portion and having an opening coaxial with the seat portion, a valve member to cooperate with the seat portion, a tension spring secured to said abutment and valve member and tending to close the valve, and an actuator, the actuator having a housing secured to the valve member, a pin extending from the housing and having a threaded portion and an adjusting nut threaded on the pin, the nut having a portion of reduced outside diameter loosely received in said opening and a portion of larger outside diameter greater than that of said opening and situated between the housing and said opening, said seat portion laterally restraining said actuator only by means of said nut and spring, the actuator further having means to extend the pin variable distances from the housing to cause said portion of larger diameter to bear upon said abutment.

3. A valve according to claim 2 in which said actuator is responsive to the temperature of a fluid circulated through the valve.

4. A temperature-controlled valve having, in combination, a seat member, the seat member having an annular flange, a seat and a portion extending longitudinally from the seat, a valve member to cooperate with the seat and having an annular recess, a coil spring fastened at one end to said portion, having the opposite end in said recess and tending to close the valve, an actuator adapted to force the valve member from the seat upon an increase in the temperature of a fluid controlled by the valve, and a quantity of fusible material to secure said opposite end in said recess when solidified and to fuse to release the spring at a predetermined temperature above the normal operating range of said actuator.

5. A valve having, in combination, a seat member having a seat and a spring securing portion longitudinally displaced from the seat, a valve member in position to engage the seat on the side thereof opposite to said spring-securing portion and having an annular recess, a tension spring fastened at one end to said spring securing portion, having an opposite end in said recess and tending to close the valve, an actuator adapted to control the displacement of the valve from the seat, and a quantity of fusible material to secure said opposite end of the spring in said recess when solidified and to fuse to release the spring at a predetermined temperature.

6. A temperature-controlled valve having, in combination, a seat member having an annular mounting portion, a seat portion and a spring-securing portion longitudinally displaced from the seat portion and having an opening generally coaxial therewith, a valve member to cooperate with the seat, a tension spring secured at one end to said spring-securing portion and at the other end to the valve member and tending to close the valve, and an actuator having a housing engaged with the valve member and a member slidably extensible through an aperture in the housing and provided with an abutting portion received with lateral clearance in said opening, said abutting portion having a lateral extension situated between the opening and the housing to engage said spring-securing portion about said opening, said actuator further having a chamber to receive said slidable member, a deformable body surrounding and enclosing the end of said slidable member and attached to the housing about said aperture, and a quantity of temperature-sensitive expansible-contractible material filling the balance of the space in the housing and annularly disposed about said body.

7. A temperature-controlled valve having, in combination, a seat member having an annular mounting portion, a seat portion and a spring-securing portion longitudinally displaced from the seat portion and having an opening generally coaxial therewith, a valve member to cooperate with the seat, a tension spring secured at one end to said spring-securing portion and at the other end to the valve member and tending to close the valve, and an actuator having a housing engaged with the valve member, a member slidably extensible through an aperture in the housing and an adjusting nut threaded on said slidable member and received with lateral clearance in said opening, said nut having a lateral extension situated between the opening and the housing to engage said spring-securing portion about said opening, said actuator further having a chamber to receive said slidable member, a deformable body surrounding and enclosing the end of said slidable member and attached to the housing about said aperture, and a quantity of temperature-sensitive expansible-contractible material filling the balance of the space in the housing and annularly disposed about said body.

References Cited in the file of this patent

UNITED STATES PATENTS

| | | |
|---|---|---|
| 2,271,786 | Watkins | Feb. 3, 1942 |
| 2,797,873 | Woods | July 2, 1957 |
| 2,829,834 | Drapeau et al. | Apr. 8, 1958 |
| 2,850,898 | Eskin | Sept. 9, 1958 |
| 2,857,105 | Drapeau | Oct. 21, 1958 |
| 2,872,117 | Puster | Feb. 3, 1959 |
| 2,873,609 | Von Wangenheim | Feb. 17, 1959 |
| 2,919,860 | Wagner | Jan. 5, 1960 |